Patented Aug. 7, 1928.

1,680,224

UNITED STATES PATENT OFFICE.

LEON LILIENFELD, OF VIENNA, AUSTRIA.

MANUFACTURE OF NEW CELLULOSE DERIVATIVES.

No Drawing. Application filed May 22, 1926, Serial No. 111,035, and in Austria May 30, 1925.

As is known, it has hitherto not been possible to prepare esters of cellulose-xanthic acids.

According to the present invention esters of cellulose-xanthic acids may be made by acting on a cellulose-xanthic acid or a cellulose xanthate with an ester of an inorganic acid under faintly alkaline, neutral or acid conditions.

As parent materials for the invention there come into question the cellulose-xanthic acids and cellulose-xanthates (viscose) obtainable by any known method with any desired practicable proportions of alkali lye and carbon-disulphide. For the preparation of these parent materials there may be used bleached or unbleached cellulose as such in any form in which it is obtainable in commerce, such as cellulose hydrate, hydrocellulose, oxycellulose, or any cellulose derivatives containing a free hydroxyl group which permits their conversion into a thion-thiol-carboxylic acid ester.

The cellulose-xanthic acid or cellulose-xanthate may be caused to react either as such (that is in the form of their compounds with an alkali, but without an appreciable excess of alkali, for example, a crude or purified viscose which has been rendered neutral or acid by means of a weak acid), or in the form of a compound with another metal, for example zinc. When the parent material is a crude viscose there may be used either the product of the reaction between carbon disulphide and alkali-cellulose, before it is dissolved, or a concentrated or dilute viscose solution, of reaction which is only slightly alkaline, or is neutral or acid. If a purified cellulose-xanthic acid or cellulose-xanthate is used in the invention, any known method of purification may be used. There may be mentioned, for example, precipitation by means of a solution of a salt or by means of alcohol, with or without previous neutralization or acidification by means of a weak acid, followed by washing the precipitated material with a solution of a salt or with diluted alcohol; precipitation by means of carbon dioxide and subsequent washing; treatment with sulphurous acid or with a bisulphite; dialysis, or the like. Wherever the context permits, the expressions "viscose", "cellulose-xanthic acid", or "cellulose-xanthate" used in the description and claims shall include the forms of cellulose-xanthic acids or cellulose-xanthates (viscose) referred to in this and the preceding paragraph.

In cases in which the viscose is at the commencement only slightly alkaline or neutral, whether this be due to the fact that only a small excess of alkali has been used in its preparation, or that its has previously been purified, it is not absolutely necessary to neutralize the alkali before acting on it with the ester of an inorganic acid.

Generally, the reaction between the cellulose-xanthic acid or the cellulose-xanthate and the ester of an inorganic acid occurs without extraneous supply of heat, but if desired, the reaction may be initiated or accelerated by warming.

The formation of the new cellulose compounds is indicated by the precipitation of the final product, which tends to separate in the form of a jelly in cases when a concentrated viscose is used as the parent material, and the mixture is stirred only slightly. If, however, the reaction mixture is more dilute, and is stirred, the new derivatives separate as a fine or coarse precipitate.

The product may be isolated, for instance, by separating the precipitate or jelly from the liquor by filtering, straining, centrifuging or the like. If the precipitate is a jelly or a bulky precipitate, it is desirable to comminute it before washing. The washing with water may be preceded by washing with alcohol, or by washing with alcohol and then with ether, benzene or the like. After washing, the product may be used in the wet state (if desired after removal of the bulk of the adhering washing liquid by pressing, suction or centrifuging), or it may first be dried.

According to the mode of their formation, and their chemical characteristics, the new compounds are in all probability esters of cellulose-xanthic acid of the type

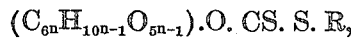
$$(C_{6n}H_{10n-1}O_{5n-1}).O.CS.S.R,$$

wherein R indicates the alcohol radical which has been introduced into the cellulose-xanthic acid, and may be an alkyl-, oxyalkyl-, aryl-, oxyaryl-, aralkyl-, or oxyaralkyl- group.

The reaction which leads to the formation of the new compounds may be represented in the simplest manner by the following equation, in which the reaction between a sodium cellulose-xanthate and ethyl iodide has been chosen as an example:—

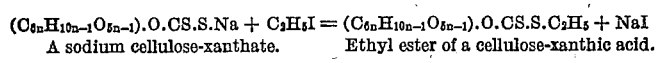
A sodium cellulose-xanthate. Ethyl ester of a cellulose-xanthic acid.

The new cellulose derivatives obtainable according to the invention are useful in part in themselves for the production of artificial products, such as artificial threads, films, plates, bands, plastic masses, coatings and layers of every kind, and in part as parent material for the manufacture of other compounds or derivatives of cellulose.

The following examples illustrate the invention, the parts being by weight:—

Example 1.—1000 parts of a crude viscose (prepared for instance by soaking 100 parts of sulphite-cellulose in sheet or fleece-form in 1000–2000 parts of a caustic soda lye of 18 per cent strength at a temperature of 15–18° C., allowing the mixture to stand at room temperature for 3–24 hours, pressing until the weight is reduced to 300–350 parts, comminuting, allowing to ripen, if desired, for 6–72 hours at room temperature, treating for several hours with 50–60 parts of carbon disulphide, and dissolving in sufficient water to produce 1000 parts of solution), corresponding with 100 parts of parent cellulose, are diluted, either in the fresh state or after allowing to stand for a short or long period (for example, 6 hours to 3 days), with 9000–10000 parts of water, and are then treated whilst stirring with dilute acetic acid (for example, acetic acid of 5–10 per cent strength), until the reaction is faintly alkaline, or neutral or acid. As soon as the hydrogen-sulphide liberated during the neutralization has escaped completely or in greater part, 100 parts of diethyl-sulphate are added to the viscose, which has become light in colour, and the mixture is stirred. After about an hour, the mass becomes gelatinous, but soon becomes liquid again with the precipitation of a fine flaky precipitate. This precipitate is separated from the mother liquor by straining, centrifuging, filtering, pressing, decanting or the like, either immediately after its formation, or after allowing the mixture to stand for several hours or days. It is then washed with water and dried in a vacuum or in the air, if desired after freeing it from water by means of alcohol, and washing with ether. The product is a white powder, particularly after it has been ground.

It is soluble in dilute alkali lye, for instance, in a caustic soda solution of 8–10 per cent strength, and also in many organic solvents, for instance, in an aqueous solution of pyridine of 70–80 per cent strength.

Example 2.—1000 parts of a viscose of 10 per cent strength (calculated on the parent cellulose), prepared as described in Example 1, are diluted with 5000–10000 parts of water, and treated with a weak acid (for instance, acetic acid of 10 per cent strength) until the reaction is very faintly alkaline, or neutral, or acid. To the viscose which has become colourless, there are then added whilst stirring, 100–170 parts of ethyl-iodide, and the mixture is vigorously stirred after the addition is completed. According to the extent of dilution of the viscose, the reaction-mixture thickens and becomes slimy and gelatinous after a shorter or longer period, and then again becomes liquid: the product of the reaction meanwhile separating in the form of fine or coarse flakes or grains. It may be isolated in the manner described in the preceding example.

The ethyl ester of the cellulose-xanthic acid is a white powdery or flaky substance, particularly after comminution; it is soluble in dilute alkali lye, for instance in a caustic soda solution of 10 per cent strength, to a clear viscose solution, usually after swelling for some time. The solution may be worked up into transparent, shining, flexible artificial products such as films, artificial threads (particularly artificial silk), plastic masses, coatings and layers of every kind, and the like, by bringing the solution into a suitable form and coagulating it by means of a suitable precipitating agent, for example, a dilute acid or a solution of a salt, in short, any precipitating agent known in the viscose industry.

An analysis gave the following results:—

| Calculated for— $C_{12}H_{19}O_9.O.CS.S.C_2H_5 = C_{15}H_{24}S_2O_{10}$ | Found |
|---|---|
| C 42.05 | 41.87 |
| H 5.60 | 5.79 |
| S 14.95 | 14.48 |

Example 3.—The procedure is as in Example 2, with the exception that 70–120 parts of ethyl bromide are used instead of the ethyl iodide. The properties of the product resemble those of the product of Example 2.

Example 4.—The procedure is as in the preceding examples, with the exception that 40–100 parts of dimethyl sulphate are used instead of the inorganic acid esters named therein.

Example 5.—The procedure is as in the preceding examples, with the exception that 100—150 parts of methyl iodide are used in place of the alkylating agents named therein. The properties of the final product resemble those of the products of the preceding examples.

In the foregoing examples, there may be used as parent material a viscose which has been purified, for example by precipitating with common salt, washing with a solution of common salt, and redissolving. In such a case, particularly if the precipitated purified viscose is washed until it is free from alkali, or until the greater part of the alkali has been removed, neutralization of the viscose is not necessary.

In all the foregoing examples, there may be used a viscose which differs from the viscose used in Example 1 in the extent to which the soda-cellulose is pressed, and in the proportion of carbon disulphide used. Thus, for instance, the soda-cellulose may be pressed until its weight is reduced to 200 parts, and it may be treated with only 20–25 parts of carbon disulphide.

Wherever the context of the following claims permits, the terms "cellulose-xanthate" and "viscose" include cellulose-xanthic acids, and the term "substantially neutral" includes the absolutely neutral, the faintly acid and the faintly alkaline conditions.

I claim:

1. Process for making new cellulose compounds which process comprises acting on a cellulose-xanthate with an ester of an inorganic acid under substantially neutral condition.

2. Process for making new cellulose compounds which process comprises acting on a cellulose-xanthate with an ester of an inorganic acid under faintly alkaline condition.

3. Process for making new cellulose compounds which process comprises acting on a cellulose-xanthate with an ester of an inorganic acid in the absence of substantial amounts of alkali.

4. Process for making new cellulose compounds which process comprises acting on viscose with an ester of an inorganic acid under substantially neutral condition.

5. Process for making new cellulose compounds which process comprises acting on viscose with an ester of an inorganic acid under faintly alkaline condition.

6. Process for making new cellulose compounds which process comprises acting on viscose with an ester of an inorganic acid in the absence of substantial amounts of alkali.

7. Process for making new cellulose compounds which process comprises acting on a cellulose-xanthate with an alkyl ester under substantially neutral condition.

8. Process for making new cellulose compounds which process comprises acting on a cellulose-xanthate with an alkyl ester under faintly alkaline condition.

9. Process for making new cellulose compounds which process comprises acting on a cellulose xanthate with an alkyl ester in the absence of substantial amounts of alkali.

10. Process for making new cellulose compounds which process comprises acting on viscose with an alkyl ester under substantially neutral condition.

11. Process for making new cellulose compounds which process comprises acting on viscose with an alkyl ester under faintly alkaline condition.

12. Process for making new cellulose compounds which process comprises acting on viscose with an alkyl ester in the absence of substantial amounts of alkali.

13. As new products esters of cellulose xanthic acids.

14. As new products alkyl esters of cellulose xanthic acids.

15. As new products ethyl esters of cellulose xanthic acids.

In testimony whereof I affix my signature.

LEON LILIENFELD.